US011110657B2

(12) United States Patent
Li et al.

(10) Patent No.: US 11,110,657 B2
(45) Date of Patent: Sep. 7, 2021

(54) SWITCHING DEVICE FOR DOUBLE NOZZLES OF 3D PRINTER

(71) Applicant: SHANGHAI FUSION TECH CO., LTD., Shanghai (CN)

(72) Inventors: Jianzhe Li, Shanghai (CN); Hua Feng, Shanghai (CN); Junjie Zong, Shanghai (CN); Wangping Long, Shanghai (CN)

(73) Assignee: SHANGHAI FUSION TECH CO., LTD., Shanghai (CN)

( * ) Notice: Subject to any disclaimer, the term of this patent is extended or adjusted under 35 U.S.C. 154(b) by 0 days.

(21) Appl. No.: 16/328,712

(22) PCT Filed: Oct. 31, 2017

(86) PCT No.: PCT/CN2017/108477

§ 371 (c)(1),
(2) Date: Feb. 26, 2019

(87) PCT Pub. No.: WO2019/080146

PCT Pub. Date: May 2, 2019

(65) Prior Publication Data

US 2021/0060859 A1 Mar. 4, 2021

(30) Foreign Application Priority Data

Oct. 24, 2017 (CN) .......................... 2017110034811

(51) Int. Cl.
*B29C 64/209* (2017.01)
*B29C 64/227* (2017.01)
*B33Y 30/00* (2015.01)

(52) U.S. Cl.
CPC .......... *B29C 64/209* (2017.08); *B29C 64/227* (2017.08); *B33Y 30/00* (2014.12)

(58) Field of Classification Search
CPC ...... B29C 64/209; B29C 64/227; B33Y 30/00
See application file for complete search history.

(56) References Cited

U.S. PATENT DOCUMENTS

2015/0290861 A1* 10/2015 Douglass ............... B33Y 30/00 264/255

FOREIGN PATENT DOCUMENTS

CN 205889899 U * 1/2017 ............. B29C 67/00
WO 2017058035 A1 * 4/2017 ........... B29C 64/227

* cited by examiner

*Primary Examiner* — Matthew J Daniels
*Assistant Examiner* — Shibin Liang
(74) *Attorney, Agent, or Firm* — Avant Law Group, LLC

(57) ABSTRACT

A switching device for double nozzles of a 3D printer, which includes two transmission blocks, a rotary part and two spring parts. The two transmission blocks are in mirror image structures with each other and are respectively mounted on two nozzle devices; each transmission block is provided with a pressure supporting and transmiting portion, and the pressure supporting and transmiting portion includes a pressing-down stopping portion, a pressure transmiting portion, and a restoring stopping portion which are connected in sequence; the rotary part is connected to the case and is provided with two pressing parts; the two spring parts respectively sleeve the two nozzle devices, and the spring part supports the corresponding transmission block; the rotary part can rotate in a reciprocating manner, the rotary part drives the pressing parts to move on the two pressure supporting and transmiting portions.

13 Claims, 3 Drawing Sheets

SWITCHING DEVICE FOR DOUBLE NOZZLES OF 3D PRINTER

TECHNICAL FIELD

The present invention relates to the technical field of 3D printing, and in particular, to a switching device for double nozzles of a 3D printer.

BACKGROUND 3D printing is one of rapid proto-typing technologies and is a technology which is based on a digital model document, applies adhesive materials such as powdery metal or plastic and constructs an object in a layer-by-layer printing manner. The 3D printing is generally implemented by adopting a digital technology material printer, is often used for manufacturing models in the fields of die manufacturing, industrial design and the like, and is gradually used for directly manufacturing some products later. There are existing parts printed by using this technology. This technology can be applied to the fields of jewelry, shoes, industrial design, buildings, engineering and construction, automobiles, aerospace, dental and medical industries, education, geographic information systems, civil engineering, guns and other fields. In a printing process, in a normal case, double nozzle devices are located at the same height. However, in the printing process of one nozzle device, the other nozzle device easily scrapes the model, which may affect printing effect.

In CN invention patent "Double-Head 3D Printer Capable with Rotationally Switching Printing Heads" with the application number 201410462135.X, in the double-head 3D printer, an electromagnetic principle is used to drive an iron core to rapidly move left and right, so as to drive a mounting plate to rotate, and further a first wire output head and a second wire output head are driven to perform cycloid motion of swing left and right around a fixed rotary axis, thereby implementing relatively vertical switching of the two wire output heads. In this patent, after an electromagnetic coil is powered on, by means of gear transmission, two sets of printing devices are driven to rotate around the fixed rotary axis, and the nozzle devices are switched by means of a height difference generated by rotation in a longitudinal plane. The technical solution realizes the function of switching the double nozzle devices, thereby realizing an avoiding function in the printing process. However, location in this solution depends on an extremely precise driving position of the electromagnetic coil, which is relatively difficult to implement and higher in costs.

In CN invention patent "Rotary Double-Nozzle Switching Device for 3D Printing" with the application number 201510052482.X, wherein a steering motor drives a steering gear to rotate according to a corresponding rotary direction, by meshing the steering gear with an arc rack, a second support passively swings to the right side in the form of a pendulum on a first support by taking a rotary center as a circle center, so that an angle difference is generated between the two nozzle devices, thereby implementing a longitudinal height difference and implementing the switching avoiding functions of the double nozzle devices. However, similarly, orientation is very hard to control after gear transmission, precise location is relatively difficult to implement and the costs are higher.

In US Patent "SINGLE-MOTOR EXTRUSION HEAD HAVING MULTIPLE EXTRUSION LINES" with U.S. Pat. No. 7,604,470B2, where a toggle plate component is part of an extrusion head and includes a base part, a rotary axis, a constructing line, a support line, a spring and the like. The base part is an auxiliary frame rotatably connected to a translation part in the rotary axis. Because of the rotary connection of the base part, the toggle plate component rotates around the rotary axis among a constructing state, a neutral state and a supporting state. The transmission of the toggle plate component among the constructing state, the neutral state and the supporting state is driven in a rotary manner. The single-motor extrusion head having multiple extrusion lines is relatively complex in structure and high in costs.

SUMMARY

In view of the disadvantages of the prior art, an object of the present invention is to provide a switching device for double nozzles of a 3D printer for resolving the foregoing problems existing in the prior art.

In order to resolve the foregoing technical problems, the present invention provides a switching device for double nozzles of a 3D printer, which is mounted on a case of the 3D printer. The case is provided with two guide slots, and two vertically disposed nozzle devices respectively penetrate into the two guide slots; the switching device for double nozzles comprises two transmission blocks, a rotary part and two spring parts; the two transmission blocks are in mirror image structures with each other, are respectively mounted on the upper ends of the two nozzle devices, and are respectively inserted into the two guide slots; each transmission block is provided with a pressure supporting and transmiting portion, and the pressure supporting and transmiting portion comprises a pressing-down stopping portion, a pressure transmiting portion and a restoring stopping portion which are connected in sequence; the rotary part is movably connected to the case and is provided with two pressing parts; the two spring parts respectively sleeve the two nozzle devices, and each spring part supports the corresponding transmission block, so that the pressure supporting and transmiting portions of the two transmission blocks respectively push against the corresponding pressing parts; the rotary part can rotate in a reciprocating manner, the rotary part drives the two pressing parts to respectively move on the two pressure supporting and transmiting portions, and when each pressing part moves to the pressing-down stopping portion from the restoring stopping portion, each pressing part pushes the pressure transmiting portion to move downward, where when one of the pressing part moves to the pressing-down stopping portion of the contacted transmission block, the other pressing part moves to the restoring stopping portion of the contacted transmission block, and when each pressing part moves on the pressing-down stopping portion or the restoring stopping portion, the pressure supporting and transmiting portion keeps a stopping state.

Preferably, the switching device for double nozzles of a 3D printer also comprises a rotary axis penetrating through the rotary part, the rotary axis is located between the two transmission blocks, and a middle axis of the rotary axis is vertical to the horizontal plane.

Further, the pressure supporting and transmiting portion is arranged on top surface of the transmission block, the pressing-down stopping portion is a first plane, and the restoring stopping portion is a plane; the first plane and the second plane are both in parallel with the horizontal plane, and a horizontal height of the first plane is higher than that of the second plane; and the pressure transmiting portion is a spirally rising slope connected between the first plane and the second plane.

Still further, each transmission block comprises a block body and a supporting body disposed on a top surface of the block body, and the pressure supporting and transmiting portion is disposed on top surface of the supporting body.

Yet further, each supporting body is located on one side of the connected block body close to the rotary axis.

Further, the shape of outside surface of the block body corresponds to those of inner slot wall of the guide groov, and the block body and the guide groov are in clearance fit.

Further, the two pressing parts are horizontally disposed in opposite directions.

Further, the switching device for double nozzles of a 3D printer also comprises a drive component driving the rotary part to rotate.

Still further, the drive component comprises a drive part, and an output end of the drive part is connected to an input gear; and an output gear is connected to the rotary part, and the input gear is meshed with the output gear.

The switching device for double nozzles of a 3D printer consistent with the present invention has the following beneficial effects:

The switching device for double nozzles of a 3D printer of the present invention can effectively eliminate a scraping phenomenon of the double nozzle devices in a 3D printing process, and the nozzle devices have relatively high location accuracy and repeated location accuracy in a moving process, so that 3D printing can be stably implemented, and the switching device for double nozzles of a 3D printer of the present invention is simple in structure, convenient to mount and high in practicability.

DESCRIPTION OF COMPONENT REFERENCE NUMERALS

Figure 1:
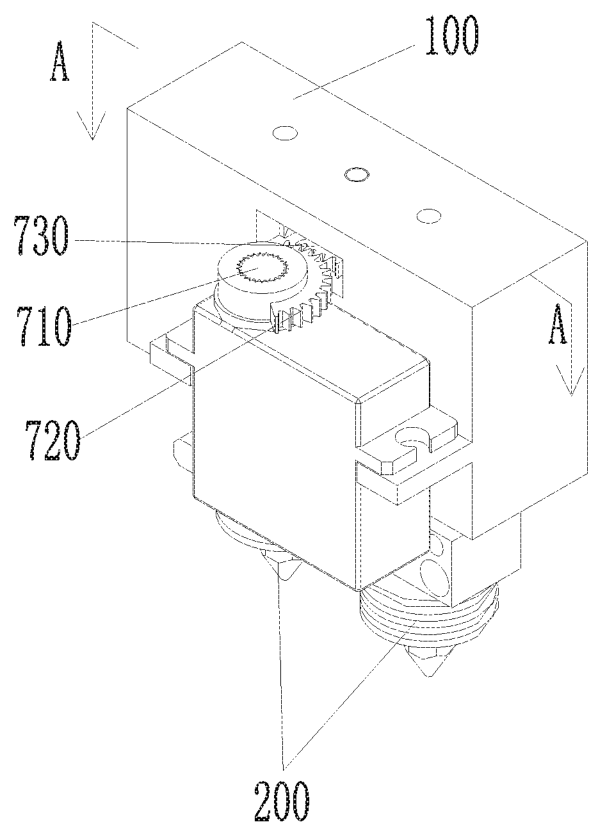
FIG. 1 is a schematic diagram of an external structure of a switching device for double nozzles of a 3D printer according to the present embodiment.

100 case
110 guide slot
200 nozzle device
300 transmission block
301 block body
302 supporting body
303 slot
310 pressure supporting and transmiting portion
311 pressing-down stopping portion
312 pressure transmiting portion
313 restoring stopping portion
400 rotary part
410 pressing part
500 spring part
600 rotary axis
710 drive part
720 input gear
730 output gear

DETAILED DESCRIPTION OF THE PREFERRED EMBODIMENTS

The implementations of the present invention are explained with specific embodiments, and a person skilled in the art can easily understand other advantages and effects of the present invention via the content disclosed in the present specification.

It should be learned by referring to the drawings that the structures, proportions and sizes drawn in the drawings of the present specification are all merely intended to cooperate with the content disclosed in the specification for understanding and reading by a person skilled in the art instead of limiting implementable conditions of the present invention, and therefore do not possess any technologically substantial meaning. Any structural modification, change of proportional relations or adjustment of sizes shall still fall within a scope that the technical content disclosed in the present invention can cover without affecting the effects and purposes achieved by the present invention. Meanwhile, the terms “upper”, “lower”, “left”, “right”, “middle” and “one”, etc., referred in the present specification are also intended for clear description instead of limiting an implementable scope of the present invention, and the change or adjustment of relative relations shall fall within the implementable scope of the present invention without substantially changing the technical content.

Figure 2:
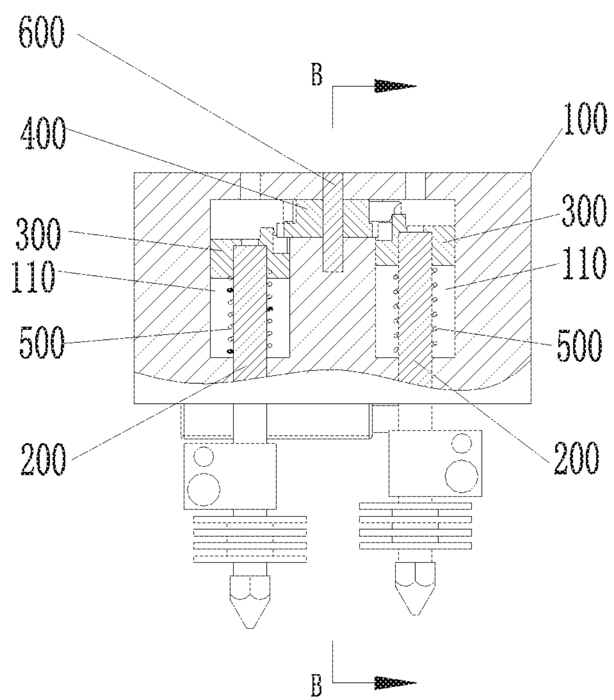
FIG. 2 is a schematic diagram of a section along A-A in FIG. 1.
Figure 3:
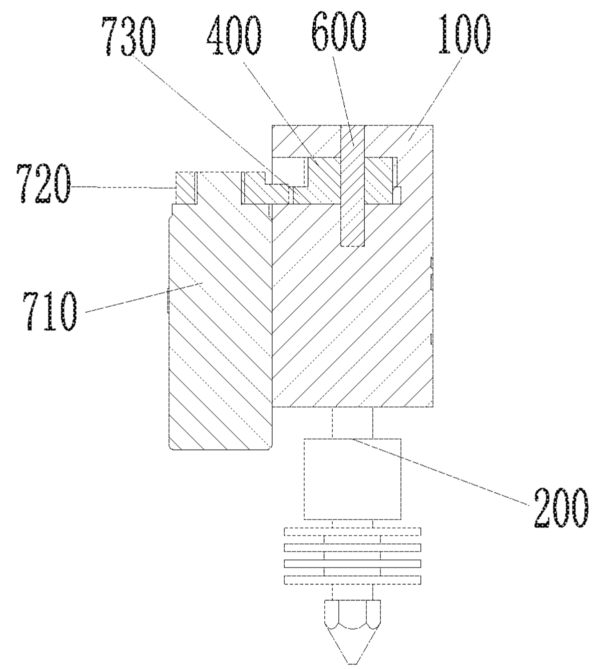
FIG. 3 is a schematic diagram of a section along B-B in FIG. 2.
Figure 4:
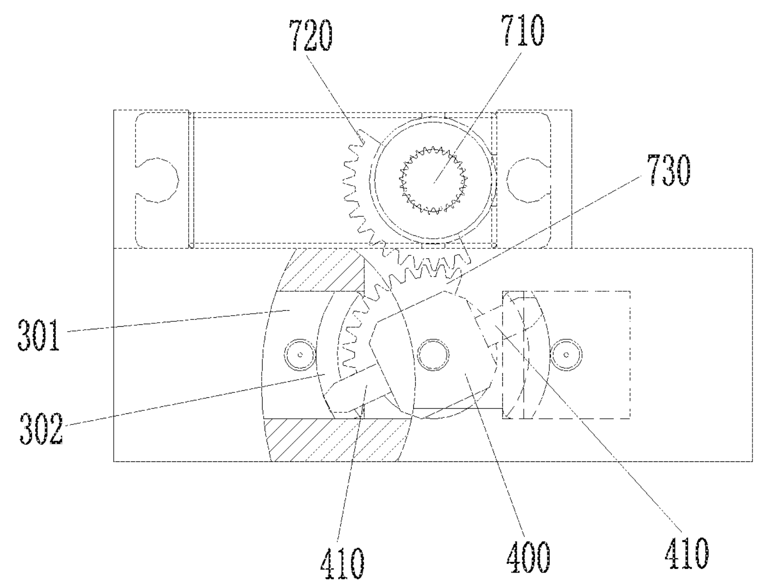
FIG. 4 is a schematic top view of an internal structure of a switching device for double nozzles of a 3D printer according to the present embodiment.
Figure 5:
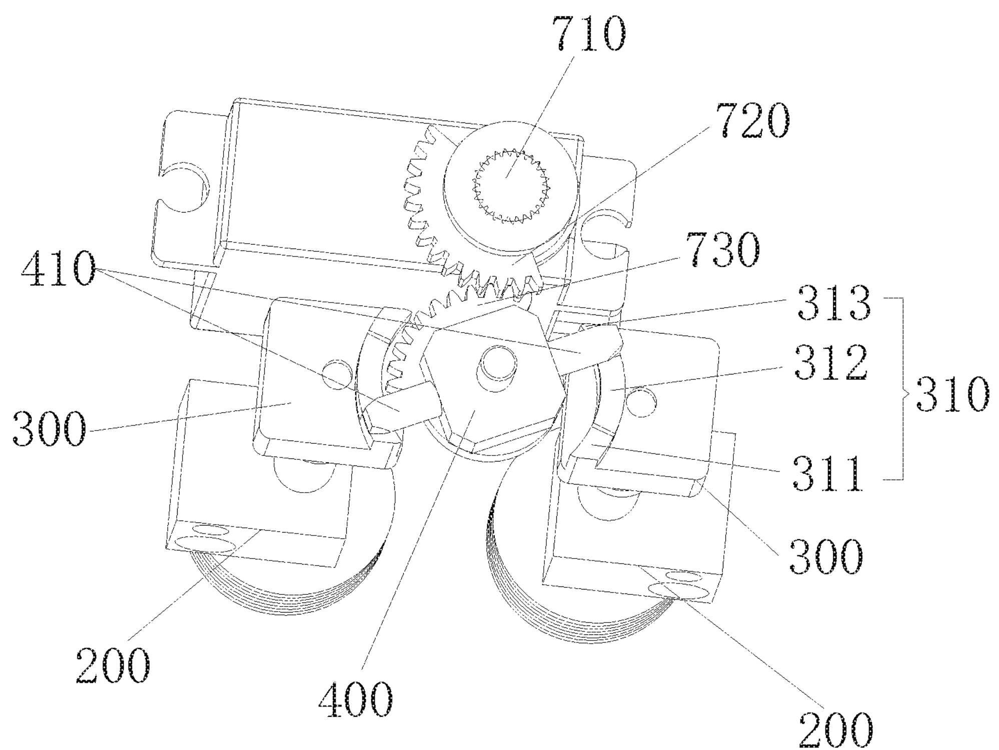
FIG. 5 is a schematic structural three-dimensional diagram when a switching device for double nozzles of a 3D printer is not provided with a case according to the present embodiment.
Figure 6:
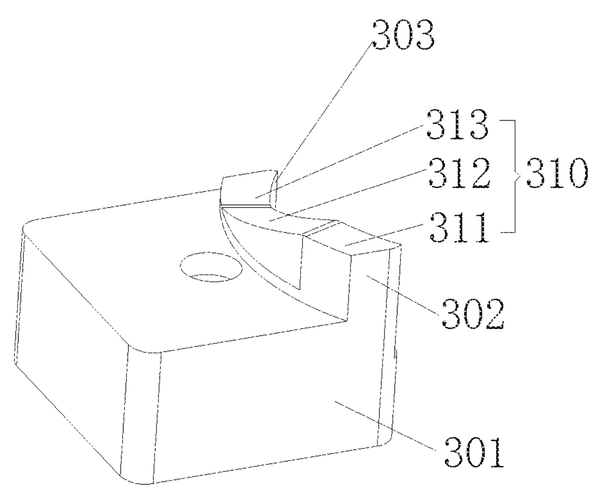
FIG. 6 is a schematic structural three-dimensional diagram of a transmission block of a switching device for double nozzles of a 3D printer according to the present embodiment.

As shown in FIG. 1 to FIG. 6, a switching device for double nozzles of a 3D printer according to the present embodiment is mounted on a case 100 of the 3D printer, the case 100 is provided with two guide slots 110, and two vertically disposed nozzle devices 200 respectively penetrate into the two guide slots 110; and the switching device for double nozzles comprises:

two transmission blocks 300, which are in mirror image structures with each other, are respectively mounted on the upper ends of the two nozzle devices 200, and are respectively inserted into the two guide slots 110, where each transmission block 300 is provided with a pressure supporting and transmiting portion 310, and the pressure supporting portion 310 comprises a pressing-down stopping portion 311, a pressure transmiting portion 312 and a restoring stopping portion 313 which are connected in sequence;

a rotary part 400, movably connected to the case 100 and provided with two pressing parts 410; and two spring parts 500, respectively sleeving the two nozzle devices 200, where each spring part 500 supports the corresponding transmission block 300, so that the pressure supporting and transmiting portions 310 of the two transmission blocks 300 respectively push against the corresponding pressing parts 410; wherein the rotary part 400 is capable of rotating in a reciprocating manner, the rotary part 400 drives the two pressing parts 410 to respectively move on the two pressure supporting and transmiting portions 310, and when each pressing part 410 moves to the pressing-down stopping portion 311 from the restoring stopping portion 313, each pressing part 410 pushes the pressure transmiting portion 312 to move downward, wherein when one pressing part 410 moves to the pressing-down stopping portion 311 of the contacted transmission block 300, the other pressing part 410 moves to the restoring stopping portion 313 of the contacted transmission block 300, and when each pressing part 410 moves on the pressing-down stopping portion 311 or the restoring stopping portion 313, the pressure supporting and transmiting portion 310 keeps a stopping state.

The rotary part 400 in accordance with the present invention rotates in a reciprocating manner to drive the two pressing parts 410 to respectively move on the pressure supporting and transmiting portions 310 of the two transmission blocks 300; and because the two transmission blocks 300 are in mirror image structures with each other, wherein when one pressing part 410 moves to the pressing-down stopping portion 311 from the restoring stopping portion 313, the other pressing part 410 moves to the restoring stopping portion 313 from the pressing-down stopping portion 311.

When the pressing part 410 moves to the pressing-down stopping portion 311 from the restoring stopping portion 313, the pressing part 410 pushes the pressure transmiting portion 312 to move downward, then the transmission block 300 is enabled to drive the nozzle device 200 to move downward, and the spring part 500 is compressed; and when the pressing part 410 moves to the restoring stopping portion 313 from the pressing-down stopping portion 311, restoring force of the spring part 500 pushes the pressure transmiting portion to move upward, and then the nozzle device 200 is enabled to move upward;

Because of a rotary amplitude of the rotary part 400, when one of the pressing parts 410 moves to the pressing-down stopping portion 311 of the contacted transmission block 300, the other pressing part 410 moves to the restoring stopping portion 313 of the contacted transmission block 300. Therefore, when one of the two nozzle devices 200 moves downward, the other nozzle device 200 moves upward, and the staggering avoidance of the two nozzle devices 200 in a vertical direction is achieved to eliminate a scraping phenomenon in a 3D printing process.

When each pressing part 410 moves on the pressing-down stopping portion 311 or the restoring stopping portion 313, the pressure supporting and transmiting portion 310 keeps a stopping state. Therefore, even the rotary part 400 has a rotary error, and the rotary part 400 continues to move on the pressing-down stopping portion 311 or the restoring stopping portion 313, the pressure supporting and transmiting portion 310 will not be further driven, so that a longest path that the nozzle device 200 moves in the vertical direction corresponds to a moving process that the pressing part 410 pushes the whole pressure transmiting portions 312, which effectively eliminates a transmission error caused by the rotary error of the rotary part 400. Therefore, the repeated location that the nozzle device 200 moves in the vertical direction is kept consistent and relatively high location accuracy and repeated location accuracy are achieved.

The switching device for double nozzles of a 3D printer further comprises a rotary axis 600 penetrating through the rotary part 400, and the rotary axis 600 is located between the two transmission blocks 300 and a middle axis of the rotary axis 600 is vertical to the horizontal plane. Because of the rotary axis 600 vertically disposed between the two transmission blocks 30, the rotary part 400 rotates around the rotary axis 600 in the plane of a horizontal direction, the rotary part 400 drives the two pressing parts 410 to synchronously move on the pressure supporting and transmiting portions 310 of the corresponding transmission blocks 300, and the two nozzle devices 200 are driven to move in a reciprocating manner in the vertical direction, so that rotation of the rotary part 400 in the plane of the horizontal direction is changed to the movement of the two nozzle devices 200 in the vertical direction. In the present embodiment, the rotary axis 600 is inserted into the case 100.

The pressure supporting and transmiting portions 310 are arranged on top surfaces of the transmission blocks 300, the pressing-down stopping portion 311 is a first plane, and the restoring stopping portion 313 is a plane; the first plane and the second plane are both in parallel with the horizontal plane, and a horizontal height of the first plane is higher than that of the second plane; and the pressure transmiting portion 312 is a spirally rising slope connected between the first plane and the second plane.

Because the first plane and the second plane are both in parallel with the horizontal plane, when the pressing part 410 moves on the first plane and the second plane, the pressing carrying part 310 keeps a stopping state; and when the pressing part 410 moves on the spirally rising slope, the pressing carrying part 310 is subjected to displacement in the vertical direction. By adopting the structure adopting the spirally rising slope, the first plane and the second plane which have a height difference, is easy in machining, and stable in transmission.

Each transmission block 300 comprises a block body 301 and a supporting body 302 disposed on the top surface of the block body 301, and the pressure supporting and transmiting portion 310 is disposed on top surface of the supporting body 302. Because the block body 301 is inserted into the guide groov 110, in order to be convenient for the pressing part 410 to push the block body 301 to move in the guide groov 110 by the supporting body 302, the supporting body 302 is higher than the block body 301, which can ensure that the pressing part 410 will not interfere with the guide groov 110 when the supporting body 302 moves downward.

In order to enable the structure of the device to be more compact, each supporting body 302 is located on one side of the connected block body 301 close to the rotary axis 600, which is also convenient for pressing part 410 to move on the top surfaces of the supporting bodies 302.

Shape of outside surface of the block body 301 corresponds to that of inner slot wall of the guide groov 110, and the block body 301 and the guide groov 110 are in clearance fit. The guide groov 110 defines a moving path of the block body 301, and the guide groov 110 is vertically disposed, so that the block body 301 can stably move along the vertical direction.

The two pressing parts 410 are horizontally disposed in opposite directions. Because of the structure, the two pressing parts 410 can simultaneously and respectively move on the supporting bodies 302 of the two transmission blocks 300, and it is convenient for the two pressing parts 410 to respectively move to the pressing-down stopping portion 311 and the restoring stopping portion 313 of the corresponding transmission block 300. In the present embodiment, the pressing part 410 is a rod piece, the middle axes of the two pressing parts 410 are collinear and the middle axes of the two pressing parts 410 are in parallel with the horizontal plane.

In order to be convenient for the pressing part 410 to quickly push the transmission block 300 and thereby enable the device to be more flexible when in use, the profile of one side of the supporting body 302 away from the rotary axis 600 is arc structure corresponding to moving track of the corresponding pressing part 410.

The switching device for double nozzles of a 3D printer further comprises a drive component driving the rotary part 400 to rotate. The drive component drives the rotary part 400 to rotate, which can improve transmission efficiency.

In the present embodiment, the drive component comprises a drive part 710, an output end of the drive part 710 is connected to an input gear 720; and an output gear 730 is connected to the rotary part 400, and the input gear 720 is meshed with the output gear 730. The drive part 710 drives the input gear 720 to rotate, and the input gear 720 drives the rotary part 400 to rotate by the output gear 730. In the present embodiment, the drive part 710 and the input gear 720 are disposed outside the case 100, and the output gear 730 is disposed within the case 100. The output gear 730 and the rotary part 400 are of an integral structure, and the output gear 730 and the rotary part 400 both sleeve the rotary axis 600. The output gear 730 drives the rotary part 400 to rotate around the rotary axis 600.

The drive component can also adopt a mechanical transmission structure such as connection rod transmission.

A drive output axis of the drive part 710 and the rotary axis 600 are disposed in parallel, and because of such a structure, the drive part 710 is facilitated to transfer a drive force. In the present embodiment, the drive part 710 is a motor having forward and backward rotation functions.

One side of the transmission block 300 close to the rotary axis 600 is provided with a slot 303 corresponding to the output gear 730. The output gear 730 can enter the slot 303 during rotation, and because of the structure, the output gear 730 can be disposed between the two transmission blocks 300, so that the structure of the device is more compact.

The upper end of the spring part 500 is in contact with the block body 301 of the corresponding transmission block 300, the lower end of the spring block 500 is in contact with the slot bottom surface of the guide groov 110, and in the present embodiment, the spring part 500 is a spring.

The switching device for double nozzles of a 3D printer can effectively eliminate a scraping phenomenon of the double nozzle devices in a 3D printing process, and the nozzle devices 200 have relatively high location accuracy and repeated location accuracy in a moving process, so that 3D printing can be stably implemented, and the switching device for double nozzles of a 3D printer is simple in structure, convenient to mount and high in practicability.

In conclusion, the present invention effectively overcomes various disadvantages in the prior art and therefore has high industrial use value.

The foregoing embodiments only illustratively explain the principles and effects of the present invention instead of limiting the present invention. A person skilled in the art can modify or change the foregoing embodiments without departing from the spirit and scope of the present invention. Therefore, all equivalent modifications or changes finished by those with ordinary skill in the art without departing from the spirit and technical thoughts disclosed by the present invention shall still be covered by claims of the present invention.

What is claimed is:

1. A switching device for double nozzles of a 3D printer, mounted on a case of the 3D printer, and characterized in that:

the case is provided with two guide slots, and two vertically disposed nozzle devices respectively penetrate into the two guide slots; and the switching device for double nozzles comprises:

two transmission blocks, which are in mirror image structures with each other, are respectively mounted on upper ends of the two nozzle devices and are respectively inserted into the two guide slots, wherein each transmission block is provided with a pressure supporting and transmitting portion and a block body; each pressure supporting and transmitting portion having a pressing-down stopping portion, a pressure transmitting portion and a restoring stopping portion which are connected in sequence; each block body having a vertical center axis with a coaxial hole passing therethrough for feeding a respective nozzle;

a rotary part, movably connected to the case and provided with two pressing parts; and two spring parts, respectively sleeving the two nozzle devices (200), wherein each spring part supports a corresponding transmission block, so that the pressure supporting and transmitting portions of the two transmission blocks respectively push against corresponding pressing parts;

wherein:

the rotary part is capable of rotating in a reciprocating manner, the rotary part drives the two pressing parts to respectively move on the two pressure supporting and transmitting portions and when each pressing part moves to the pressing-down stopping portion from the restoring stopping portion, each pressing part pushes the pressure transmitting portion to move downward;

when one pressing part moves to the pressing-down stopping portion of the contacted transmission block, the other pressing part moves to the restoring stopping portion of the contacted transmission block;

when each pressing part moves on the pressing-down stopping portion or the restoring stopping portion, the pressure supporting and transmitting portion keeps a stopping state;

the coaxial hole of each block body is always aligned with a central axis of each nozzle; and there is always an offset between the central axis of each nozzle and each pressure transmitting portion.

2. The switching device for double nozzles of a 3D printer as in claim 1, characterized by further comprising a rotary axis penetrating through the rotary part, wherein the rotary axis is located between the two transmission blocks, and a middle axis of the rotary axis is vertical to the horizontal plane.

3. The switching device for double nozzles of a 3D printer as in claim 2, characterized in that the pressure supporting and transmitting portion is arranged on top surface of the transmission block, the pressing-down stopping portion is a first plane, and the restoring stopping portion is a second plane; the first plane and the second plane are both in parallel with the horizontal plane, and a horizontal height of the first plane is higher than that of the second plane; and the pressure transmitting portion is a spirally rising slope connected between the first plane and the second plane.

4. The switching device for double nozzles of a 3D printer as in claim 3, characterized in that each transmission block comprises a block body and a supporting body disposed on a top surface of the block body, and the pressure supporting and transmitting portion is disposed on top surface of the supporting body.

5. The switching device for double nozzles of a 3D printer as in claim 4, characterized in that each supporting body is located on one side of the connected block body close to the rotary axis (600).

6. The switching device for double nozzles of a 3D printer as in claim 2, characterized in that shape of outside surface of the block body corresponds to that of inner slot wall of the guide groove, and the block body and the guide groove is in clearance fit.

7. The switching device for double nozzles of a 3D printer as in claim 2, characterized in that the two pressing part is horizontally disposed in opposite directions.

8. The switching device for double nozzles of a 3D printer as in claim 2, characterized by further comprising a drive component driving the rotary part to rotate.

9. The switching device for double nozzles of a 3D printer as in claim 8, characterized in that the drive component comprises a drive part, an output end of the drive part is connected to an input gear; and an output gear is connected to the rotary part, and the input gear is meshed with the output gear.

10. The switching device for double nozzles of a 3D printer as in claim 1, characterized in that the pressure transmitting portion is positioned between the rotary part and the coaxial hole.

11. The switching device for double nozzles of a 3D printer as in claim 1, characterized in that the pressure transmitting portion is positioned between the rotary part and the vertical center axis.

12. The switching device for double nozzles of a 3D printer as in claim 1, characterized in that:

the two pressing parts are two rods; and a contact between each pressing part and each transmission block is a line.

13. A switching device for double nozzles of a 3D printer, mounted on a case of the 3D printer, and characterized in that:

the case is provided with two guide slots, and two vertically disposed nozzle devices respectively penetrate into the two guide slots; and the switching device for double nozzles comprises:

two transmission blocks, which are in mirror image structures with each other, are respectively mounted on upper ends of the two nozzle devices and are respectively inserted into the two guide slots, wherein each transmission block is provided with a pressure supporting and transmitting portion and the pressure supporting and transmitting portion comprises a pressing-down stopping portion, a pressure transmitting portion, and a restoring stopping portion connected in sequence;

a rotary part, movably connected to the case and provided with two pressing parts; and two spring parts, respectively sleeving the two nozzle devices, wherein each spring part supports a corresponding transmission block, so that the pressure supporting and transmitting portions of the two transmission blocks respectively push against corresponding pressing parts;

wherein:

the rotary part is capable of rotating in a reciprocating manner, the rotary part drives the two pressing parts to respectively move on the two pressure supporting and transmitting portions and when each pressing part moves to the pressing-down stopping portion from the restoring stopping portion, each pressing part pushes the pressure transmitting portion to move downward;

when one pressing part moves to the pressing-down stopping portion of the contacted transmission block, the other pressing part moves to the restoring stopping portion of the contacted transmission block;

when each pressing part moves on the pressing-down stopping portion or the restoring stopping portion, the pressure supporting and transmitting portion keeps a stopping state;

there is always an offset between a central axis of each nozzle and each pressure transmitting portion;

the two pressing parts are two rods; and a contact between each pressing part and each transmission block is a line.

* * * * *